T. A. ELPHICK.
IRONING MACHINE.
APPLICATION FILED OCT. 4, 1907.

912,450.

Patented Feb. 16, 1909.
2 SHEETS—SHEET 1.

WITNESSES.
G. V. Symes.
Edwards George.

INVENTOR.
T. A. Elphick.
Per Robert O. Phillips.
Attorney.

T. A. ELPHICK.
IRONING MACHINE.
APPLICATION FILED OCT. 4, 1907.

912,450.

Patented Feb. 16, 1909.
2 SHEETS—SHEET 2.

WITNESSES:

INVENTOR.
T. A. Elphick.
By Robert B. Phillips
Attorney.

UNITED STATES PATENT OFFICE.

THOMAS ALEXANDER ELPHICK, OF BARNES, ENGLAND.

IRONING-MACHINE.

No. 912,450.   Specification of Letters Patent.   Patented Feb. 16, 1909.

Application filed October 4, 1907. Serial No. 395,942.

*To all whom it may concern:*

Be it known that I, THOMAS ALEXANDER ELPHICK, a subject of the King of Great Britain and Ireland, and residing at 13 Lonsdale road, Barnes, in the county of Surrey, England, have invented new and useful Improvements in and Relating to Ironing-Machines, of which the following is a full and complete specification.

This invention relates to that type of machine for ironing collars, cuffs, shirt fronts, and other articles requiring a high polish, which consists essentially of an endless flexible band or apron adapted to travel between one or more heated rollers and two or more supporting rollers, and it consists in certain improvements hereinafter specified, the objects being to provide a machine that can be used either as a reciprocating or a continuous machine, to increase the output of such machines, and when the heated rollers are heated by gas to prevent the band or apron from being scorched when it is at a state of rest.

Figure 1:
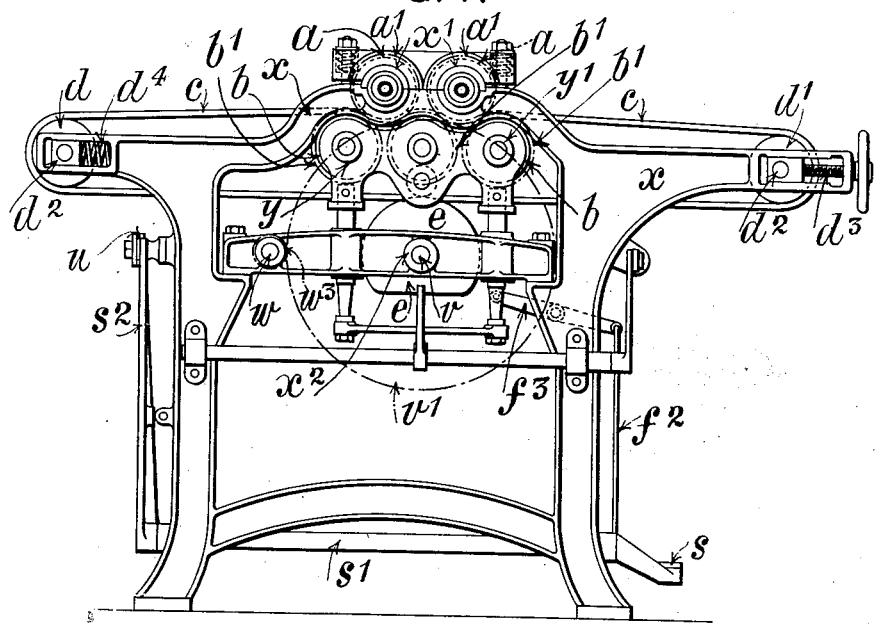
Figure 2:
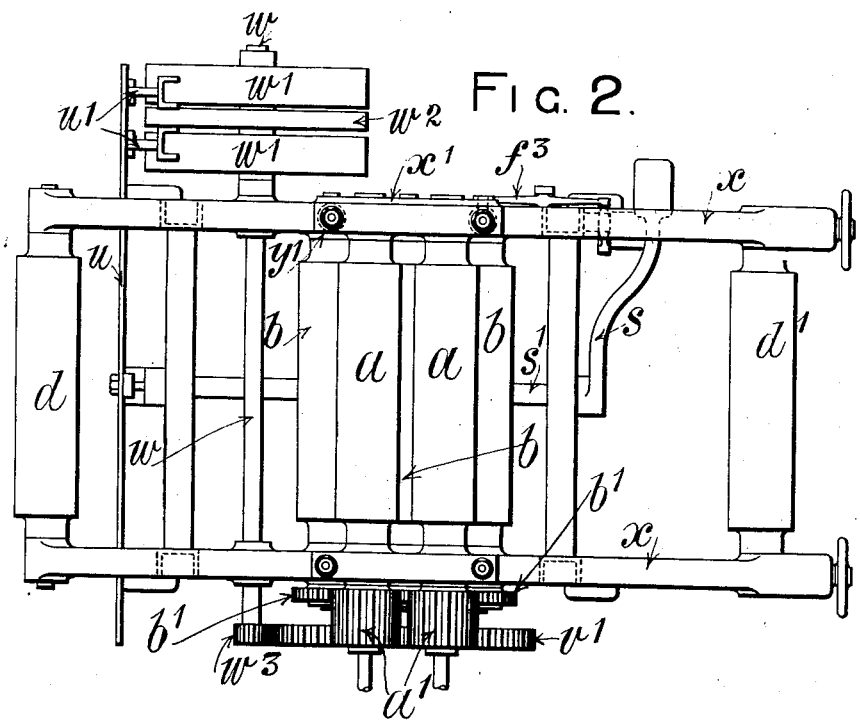
Figure 3:
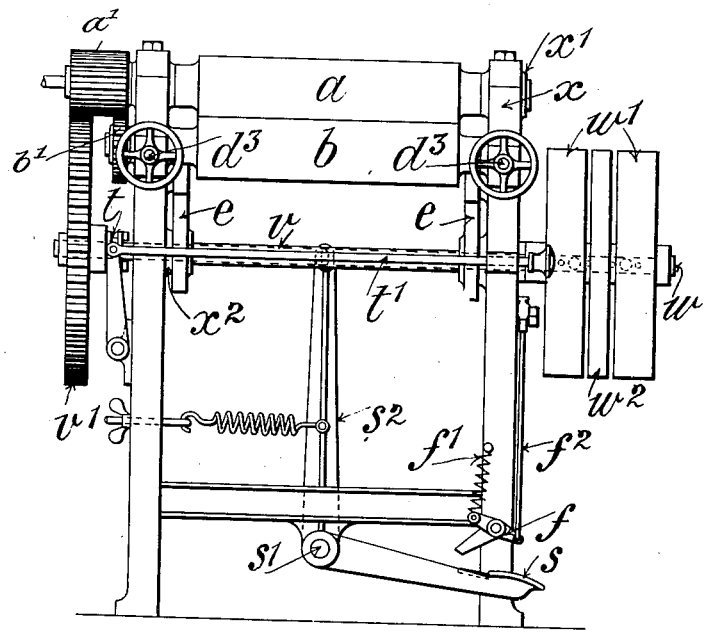
Figure 4:
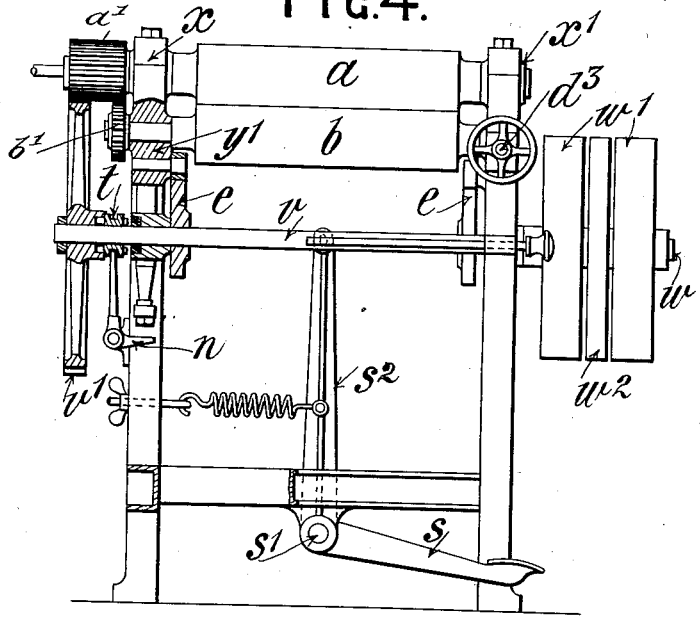

In the accompanying drawings which show—by way of illustration—some forms this invention may assume:—Figure 1, Sheet No. 1, is a view in side elevation of one form the machine may assume, Fig. 2, Sheet No. 1, is a view in plan thereof, Fig. 3, Sheet No. 2, is a view in end elevation thereof, and Fig. 4, Sheet No. 2, is a view in end elevation—partly in section—showing a modification.

Throughout the views similar parts are marked with like letters of reference.

The heated rollers $a$—of which there are two in the construction shown—are mounted to revolve in bearings $x^1$ in the frame $x$ of the machine. In suitable bearings $y^1$ carried by frames $y$ arranged to slide vertically in or with respect to the main frame $x$ are the supporting rollers $b$—of which there are three in the construction shown. The heated rollers are so positioned with respect to the supporting rollers that they lie above and between the supporting rollers and each engages through the interposed flexible band or apron two of the said supporting rollers. Consequently the endless band or apron $c$ in passing between the rollers is constrained to contact a considerable area of the heated rollers and not merely one point thereof.

Both sets of rollers are positively driven by gearing so designed as to give the heated rollers $a$ a peripheral speed superior to that of the supporting rollers $b$. A convenient form of this is that illustrated by Figs. 1 and 2 in which a spur pinion $w^3$ on the driving shaft $w$ gears with a spur wheel $v^1$ on the shaft $v$ which said spur wheel gears with spur pinions $a^1$, $a^1$ on the heated rollers $a$, the said spur pinions $a^1$, $a^1$ being of such a width that they also gear with spur pinions $b^1$, $b^1$, $b^1$ on the supporting rollers.

The band or apron $c$ is carried on two rollers $d$ $d^1$ mounted in suitable bearings $d^2$ sliding in the frame $x$ and suitable means such as the screws $d^3$ and the springs $d^4$ as shown are provided to both positively and automatically tension the band or apron. The bearings $x^1$ are spring controlled as is usual in these machines so that the said rollers can both be adjusted with respect to the supporting rollers within certain limits and can give way also within predetermined limits should anything of abnormal thickness pass between the rollers.

In the construction shown by Figs. 1 and 2 the springs are introduced between the caps of the bearings and the holding-down nuts of said caps.

The driving shaft $w$ is provided with the usual means for reversing the motion of the rollers and consequently of the band or apron, viz. two loose pulleys $w^1$ $w^1$ mounted on each side of a fixed pulley $w^2$. The bar $u$ carrying the pocket arms $u^1$ adapted to engage the two driving belts—one of which is crossed—is controlled by a foot lever $s$ mounted on one end of a longitudinally arranged shaft $s^1$ on the other end of which is an arm $s^2$ engaging the shifting bar $u$.

The rollers $b$ are kept up to their work by means of cams $e$ $e$ mounted on the shaft $v$ running in suitable bearings $x^2$ carried by the frame $x$ and driven from the shaft $w$, the said cams contacting directly or indirectly the sliding frames $y$ carrying said rollers. The shape of these cams is such that they keep the supporting rollers up in their operative positions through, say, 300° and allow the said rollers to drop so as to remove the band or apron out of contact with the heated rollers through the remaining 60° of the revolution of the shaft $v$.

To enable the band or apron to be run continuously in one direction means are provided for putting the cams $e$ out of action. A convenient method of doing this is that shown in Figs. 3 and 4 which consists in mounting the gear wheel $v^1$ on the shaft $v$, by which said shaft receives its motion from the driving shaft $w$, loosely on said shaft and in mounting on said shaft a sliding double dog clutch $t$ which is splined to the said shaft in the usual manner. If the clutch $t$ is moved in one direction the teeth on its one end engage holes or recesses in the face of the boss of the wheel $v^1$ as shown in Fig. 4 and thus couple said wheel to the shaft $v$. If the clutch $t$ is moved in the opposite direction the teeth on its opposite end engage holes or recesses in the boss of the bearing in which the shaft $v$ is mounted, thus locking said shaft—and therefore the cams $e$—against rotation. The clutch $t$ can be conveniently operated by a sliding bar such as $t^1$ conveniently mounted to be manipulated by the operator.

To automatically bring the machine to rest when the rollers have been separated a bell-crank lever $f$ is pivoted on the frame $x$; one arm of this lever is adapted to contact the foot lever $s$ and so operate as a latch to hold it in its mid position in which both driving belts are on the loose pulleys $w^1$ $w^1$ and the machine therefore at a state of rest. This arm or latch is normally kept clear of the foot lever $s$ by means of a spring such as $f^1$ as shown in Fig. 3 and it is brought into its operative position by the descent of the sliding frames $y$, due to the actions of the cams $e$, through a rocking lever $f^3$ pivoted to one of the frames $y$ which lever is connected with the other arm of the bell-crank lever $f$ by a flexible connection $f^2$.

As an alternative construction the supporting rollers and the band or apron may be brought to a state of rest by causing the shaft $v$ to be de-clutched from the gear wheel $v^1$ when the sliding frames $y$ are in their lower positions and the gear wheels $b^1$, $b^1$, $b^1$ on the axles of the supporting rollers $b$ are out of gear with the gear wheels $a^1$, $a^1$ on the heated rollers $a$. A convenient method of effecting this is to pivot a bell-crank lever $n$ on the frame $x$ as shown in Fig. 4 so that its one end engages the sliding clutch $t$ and its other end is adapted to be contacted and operated by any convenient part of one of the frames $y$, so that on the descent of said frames the clutch $t$ is withdrawn from the wheel $v^1$.

When used as a reciprocating machine the operator causes the band or apron $c$, on which the articles to be ironed are laid, to move backwards and forwards between the rollers $a$ and $b$ by operating the reversing mechanism by the foot lever $s$ in the usual manner. When the articles are finished the operator depresses the foot lever so as to cause the band or apron to travel towards the back end of the machine until the part of the band or apron carrying the articles passes over the back end roller $d$ whereupon the said articles drop from the band or apron into a receptacle placed to receive them. At this time the cams $e$ cause the frames $y$ carrying the rollers $b$ to drop, which both brings the band or apron out of contact with the heated rollers, and also the spur gearing between the heated and the supporting rollers out of gear, thereby bringing both the band or apron and the supporting rollers to rest. As the frame $y$ drops it causes the latch formed by the bell-crank lever $f$ to assume such a position that when the operator releases the foot lever $s$ the said lever in rising is held by said latch in its mid position, by which the machine is brought to a state of rest through the medium of the loose pulleys on shaft $w$. The operator then places another lot of articles on that part of the band or apron at the front end of the machine without having to reverse the machine to bring that part of the band or apron last used back to the front end of the machine. On depressing the foot lever $s$ the driving shaft $w$ is again set in motion which causes the cams to rotate and so operate to bring the supporting rollers up into their operative positions again. When used as a continuous machine the spur wheel $v^1$ is de-clutched from the shaft $v$ and the said shaft is clutched or coupled to the frame $x$ so as to put the cams $e$ out of action, and the belt or apron is constrained to rotate continuously in one direction by retaining the foot lever $s$ in one position.

What I claim as my invention, and desire to secure by Letters Patent, is:—

1. In an ironing machine, the combination of an endless band or apron, a plurality of supporting rollers mounted in fixed bearings carried by a frame arranged to move in the vertical plane, one or more heated rollers each of which bears against two of the supporting rollers through the endless band or apron, means for positively driving both the supporting and the heated rollers so that the peripheral speed of the latter is superior to that of the former, means for reversing the direction of rotation of both sets of rollers, and means for automatically separating the two sets of rollers after the band or apron has traveled a predetermined distance, as set forth.

2. In an ironing machine, the combination of an endless band or apron, a plurality of supporting rollers mounted in fixed bearings carried by a frame arranged to move in the vertical plane, one or more heated rollers each of which bears against two of the supporting rollers through the endless band or apron, means for positively driving both the supporting and the heated rollers so that the peripheral speed of the latter is superior to that of the former, means for reversing the direction of rotation of both sets of rollers, means for automatically separating the two sets of rollers after the band or apron has traveled a predetermined distance, and means for rendering said automatic device inoperative, as set forth.

3. In an ironing machine, the combination of an endless band or apron, a plurality of supporting rollers mounted in fixed bearings carried by a frame arranged to move in the vertical plane, one or more heated rollers each of which bear against two of the supporting rollers through the endless band or apron, means for positively driving both the supporting and the heated rollers, means for raising and lowering the supporting rollers, and means for automatically disconnecting the driving mechanism when the heated and supporting rollers are separated whereby the said rollers cease to rotate, as set forth.

4. In an ironing machine, the combination of an endless apron, a plurality of supporting rollers mounted in fixed bearings carried by a frame arranged to move in the vertical plane, one or more heated rollers each of which bear against two of the supporting rollers through the endless band or apron, means for positively driving both the supporting and the heated rollers, means for raising and lowering the supporting rollers, means for reversing the direction of rotation of the two sets of rollers, and means for automatically disconnecting the driving mechanism when the two sets of rollers are separated, as set forth.

In testimony whereof I have signed my name in the presence of two subscribing witnesses.

THOMAS ALEXANDER ELPHICK.

Witnesses:
ROBERT E. PHILLIPS,
F. L. RAND.